(12) United States Patent
Martin

(10) Patent No.: US 6,338,393 B1
(45) Date of Patent: Jan. 15, 2002

(54) PIVOTING FRAME SUSPENSION SCOOTER

(76) Inventor: Christopher V. Martin, P.O. Box 6491, Scottsdale, AZ (US) 85260

(*) Notice: Subject to any disclaimer, the term of this patent is extended or adjusted under 35 U.S.C. 154(b) by 0 days.

(21) Appl. No.: 09/607,555

(22) Filed: Jun. 29, 2000

(51) Int. Cl.⁷ .................. B62D 61/02; B62K 11/10
(52) U.S. Cl. ........................... 180/227; 180/228
(58) Field of Search .................. 180/219, 227, 180/228, 205, 206; 280/87.041, 87.043, 87.03, 87.021

(56) References Cited

U.S. PATENT DOCUMENTS

| | | | |
|---|---|---|---|
| 2,792,236 A | * 5/1957 | Jacquart | |
| 4,821,832 A | * 4/1989 | Patmont | 180/208 |
| 5,388,659 A | 2/1995 | Pepe | 180/219 |
| 6,012,539 A | 1/2000 | Patmont | 180/223 |
| 6,047,786 A | * 4/2000 | Stevenson et al. | 180/65.1 |
| 6,095,274 A | * 8/2000 | Patmont | 180/181 |

* cited by examiner

Primary Examiner—Kevin Hurley

(57) ABSTRACT

An improved motorized scooter utilizing suspension provided with a large tubular chassis having two central brackets, supporting a rider's platform. The front of the tubular chassis bends upward through a notch in the platform upward above the front wheel to support a steering head tube. The steering head tube supports a fork which holds the front wheel. The rear wheel is contained in a supporting bracket which also holds the engine relative to the rear wheel allowing it to be operatively connected. The central tubular member is pivoted somewhere along its length so that the frame halves can rotate in respect to each other along the pivot point. The long lever arm provided by utilizing the frame as a suspension element allows for greater terrain following characteristics due to the increased leverage. Rotation between frame halves is resisted by a shock absorber with either end connected to the respective frame halves. When driving over uneven terrain, the weight of the rider forces down upon the rider's platform which is connected to one or the other frame halves, this suspension system allows the rider to transverse uneven terrain with greater comfort, control and safety.

8 Claims, 8 Drawing Sheets

PIVOTING FRAME SUSPENSION SCOOTER

BACKGROUND

1. Field of Invention

This Invention relates to motor powered scooters. More particularly a construction of a suspensioned all terrain scooter is disclosed in which a frame supporting a platform for standing rider is supported on a large central tubular member. The central tubular member is pivoted somewhere along its length so that the frame halves can rotate in respect to each other along the pivot line. Rotation between frame halves is resisted by a shock absorber with either end mounted to the respective frame halves. When driving over uneven terrain, the weight of the rider forces down upon the rider's platform, which is connected to one or the other halves of the frame. Subsequently the frame halves pivot allowing the platform a downward motion, which is absorbed by the shock absorber, which is connected to the two frame halves, this suspension system allows the user to transverse uneven terrain with greater comfort, control and safety.

2. Background Art

All terrain-motorized scooters are known. Such scooters have been available since Dec. 25, 1996 from Martin Manufacturing of Scottsdale, Ariz. under the trade name Martin Mini. A scooter is disclosed with a steerable front wheel and rear wheel. The front wheel steers and the rear wheel is motor driven. The reader can see and understand that the scooter in Patmont, U.S. Pat. No. 4,821,832 is a rigid frame with no provision other than the flexure of the frame made for suspension, also U.S. Pat. No. 6,012,539 again, no provision is made for suspension. U.S. Pat. No. 5,388,659 also shows a folding motor scooter with no provision made for suspension. There has arisen a need for suspension systems on small-motorized scooters to help make driving over uneven surfaces safer, easier, with greater comfort and speed.

Originally, scooters were made with rigid frames. This made for difficulty in driving over rough terrain, this problem has been partly solved by the implementation of shock absorbing means in the addition of pneumatic tires, but these scooters still had significant problems driving over rough terrain, U.S. Pat. No. 6,012,539 shows an all terrain scooter with pneumatic tires, this failed to solved the problem of driving over an uneven terrain because the pneumatic tires did not have sufficient shock absorbing capacities. A provision needed to be made in the frame of the scooter to absorb shock. Folding motorcycles and mini bikes, mostly use suspension in their frames to overcome road irregularities. However, due to the simplicity of folding scooters, no one has incorporated shock-absorbing frame to absorb road irregularities. Because placement of the motor required close proximity to the rear wheel, swing arms for independent movement of the rear wheel as used in motorcycles was impractical due to the length of the swing arm and forward placement of the motor. By leaving the motor in place over the rear wheel and pivoting the frame, the problem of incorporating suspension is overcome. Although this suspension does not allow the motor to be isolated from road shock, the longer lever of the pivoting frame causes less movement to the motor than a short swing arm would, also the operator of the vehicle enjoys the benefits of suspension with the platform from which he rides being suspended and isolated from road irregularities due to the action of the pivoting frame and the shock absorber mounted between the frame halves. By mounting the shock absorber on top of the frame allows for the use of a commonly available shock absorber from the mountain bike industry, this brings about a cost saving over developing a specialty shock absorber or spring for this application. A more effective suspension is realized due to the pivoting the frame, instead of a short swing arm, because of the longer lever arm that the pivoting frame permits, which allows for the scooter frame to follow larger uneven surfaces better than a shorter swing arm.

SUMMARY OF THE INVENTION

An all terrain suspension scooter is provided with a large central tubular chassis having two central brackets supporting a platform. At the front of the tubular chassis bends upward through a notch in the platform upward above the front wheel to support a steering head tube. The steering head tube supports a fork that holds the front wheel. The rear wheel is contained in a supporting bracket which also holds the engine relative to the rear wheel allowing it to be operatively connected, possibly the bracket supports the fuel tank. The central tubular member is pivoted somewhere along its length so that the frame halves can rotate in respect to each other along the pivot line. Rotation between frame halves is resisted by a shock absorber with either end mounted to the respective frame halves. When driving over uneven terrain, the weight of the rider forces down upon the rider's platform that is connected to one or the other halves of the frame. Subsequently the frame halves pivot allowing the platform a downward motion that is absorbed by the shock absorber which is connected to the two frame halves, this suspension system allows the user to transverse uneven terrain with greater comfort, control and safety.

OBJECTS AND ADVANTAGES

Figure 1:
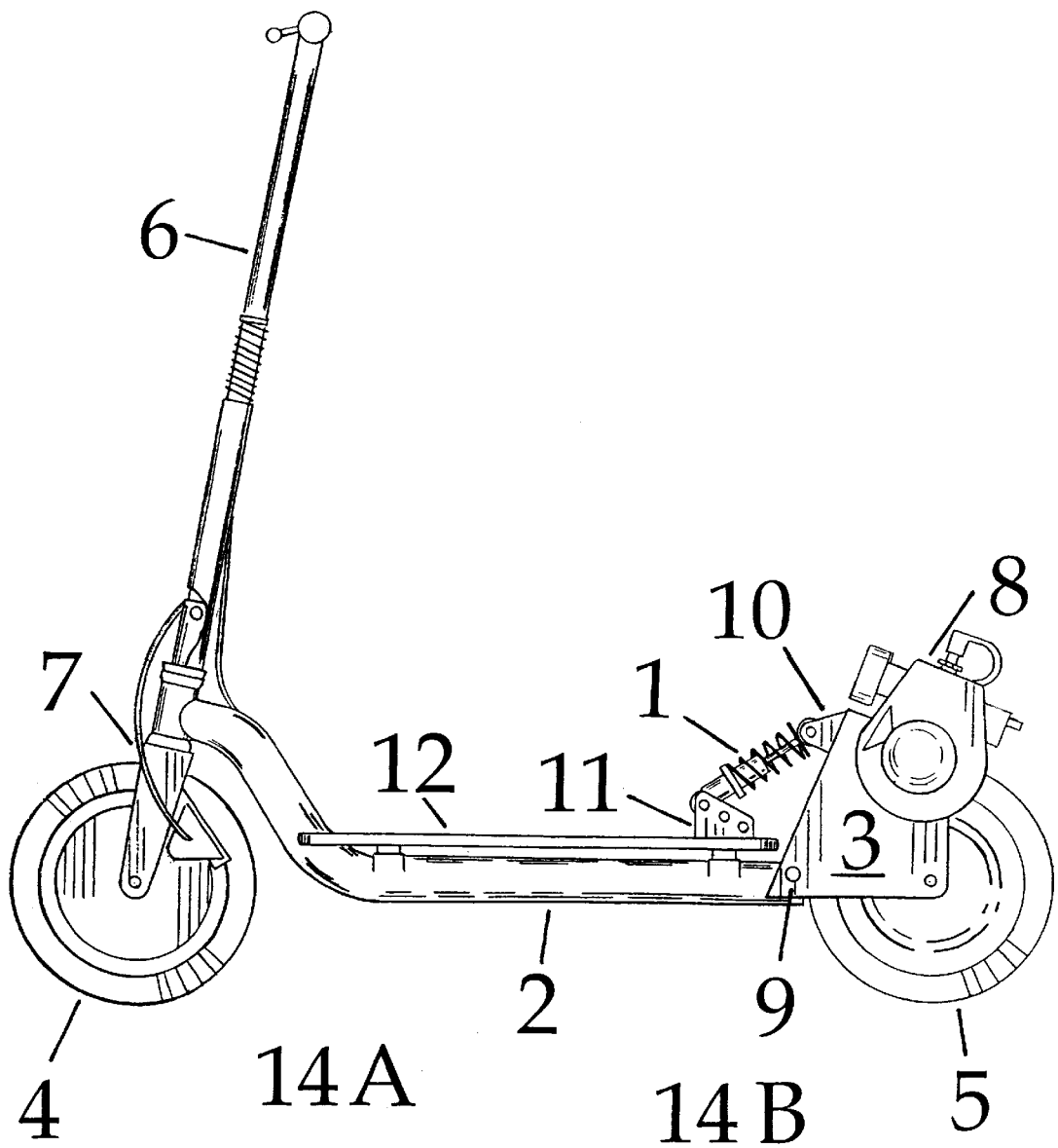
FIGS. 1A and 1B are side views of the scooter in normal and folded configurations, respectively.
Figure 1:
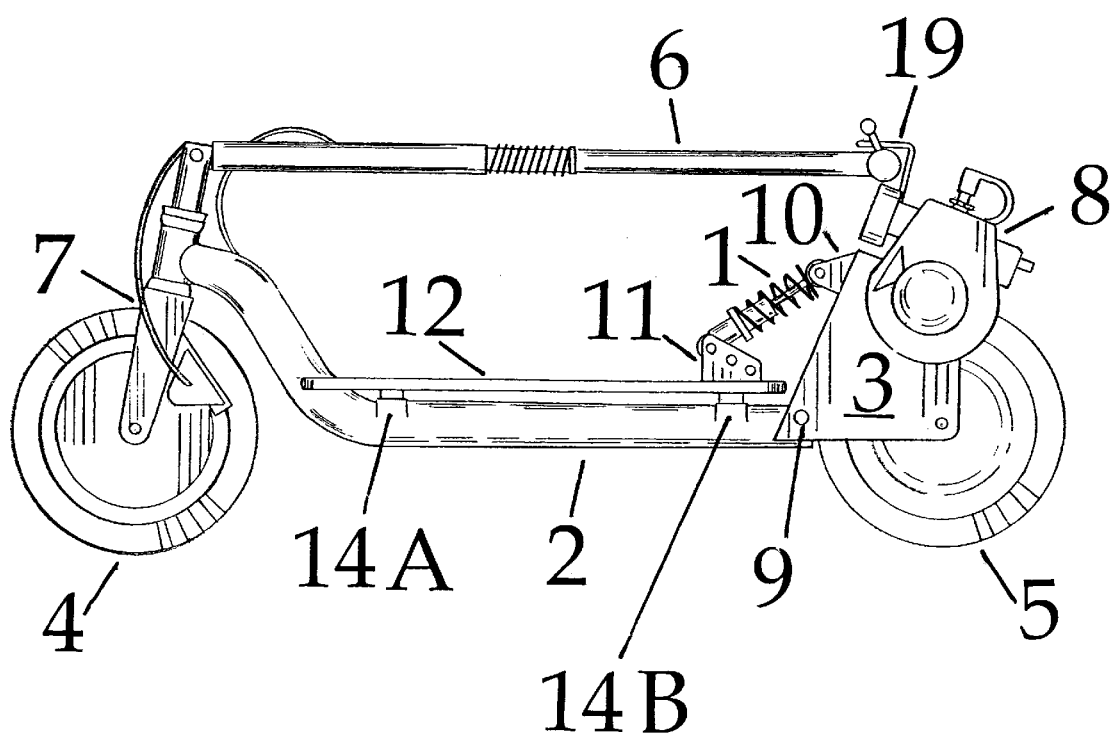

There has arisen a need for suspensioned folding portable motor scooters, such vehicles can be utilized to transverse uneven terrain more safely, with greater comfort to the operator allowing better traction, and safer vehicle control, due to the terrain following characteristics of the pivoting suspension frame.

According, several objects and advantages of my invention are:

(A.) An improved scooter frame using a shock absorber to isolate road irregularities transmitted to the frame through the wheels which solves the disadvantages of a solid frame in U.S. Pat. No. 5,388,659 and also U.S. Pat. No. 4,821,8312 and also U.S. Pat. No. 6,012,539.

(B.) A lighter weight frame can be incorporated due to the action of the shock absorber to absorb overloads in the frame (C.) The shock absorbing frame can make the scooter safer for operation on uneven terrain, due to the increase in control (D.) Traction is improved to the rear wheel due to the action of the shock absorbing frame pivoting to follow the terrain (E.) Cornering is improved due to the action of the shock absorbing frame pivoting, absorbing force as cornering loads are introduced (F.) Due to the shock absorber location on the frame, sufficient room is afforded to allow a small, high quality; shock absorber such as used in the mountain bike industry (G.) By mounting the shock absorber on top of the frame allows for the use of a commonly available shock absorber from the mountain bike industry, this brings about a cost saving over developing a specialty shock absorber or spring for this application (H.) A more effective suspension is realized due to pivoting the frame. Because of the longer lever arm that the pivoting frame permits, which allows for the scooter frame to follow larger uneven surfaces better than a shorter swing arm.

Further objects and advantages of my invention will become apparent from the considering of the drawings and the ensuing description.

REFERENCE NUMERALS IN DRAWINGS 1 shock absorber
2 front frame
3 rear frame
4 front wheel
5 rear drive wheel
6 steering handle
7 front fork
8 engine
9 horizontal pivot
10 shock mount rear frame
11 shock mount front frame
12 riders platform
13 fuel tank
14A,B bracket for platform
15 reciprocating sleeve
16 spring
17 hinge
18 head tube
19 hook latch
20 kickstand
21A,B bearing
22 drive spindle
23 clutch
24 steering column

DESCRIPTION OF INVENTION

Figure 2:
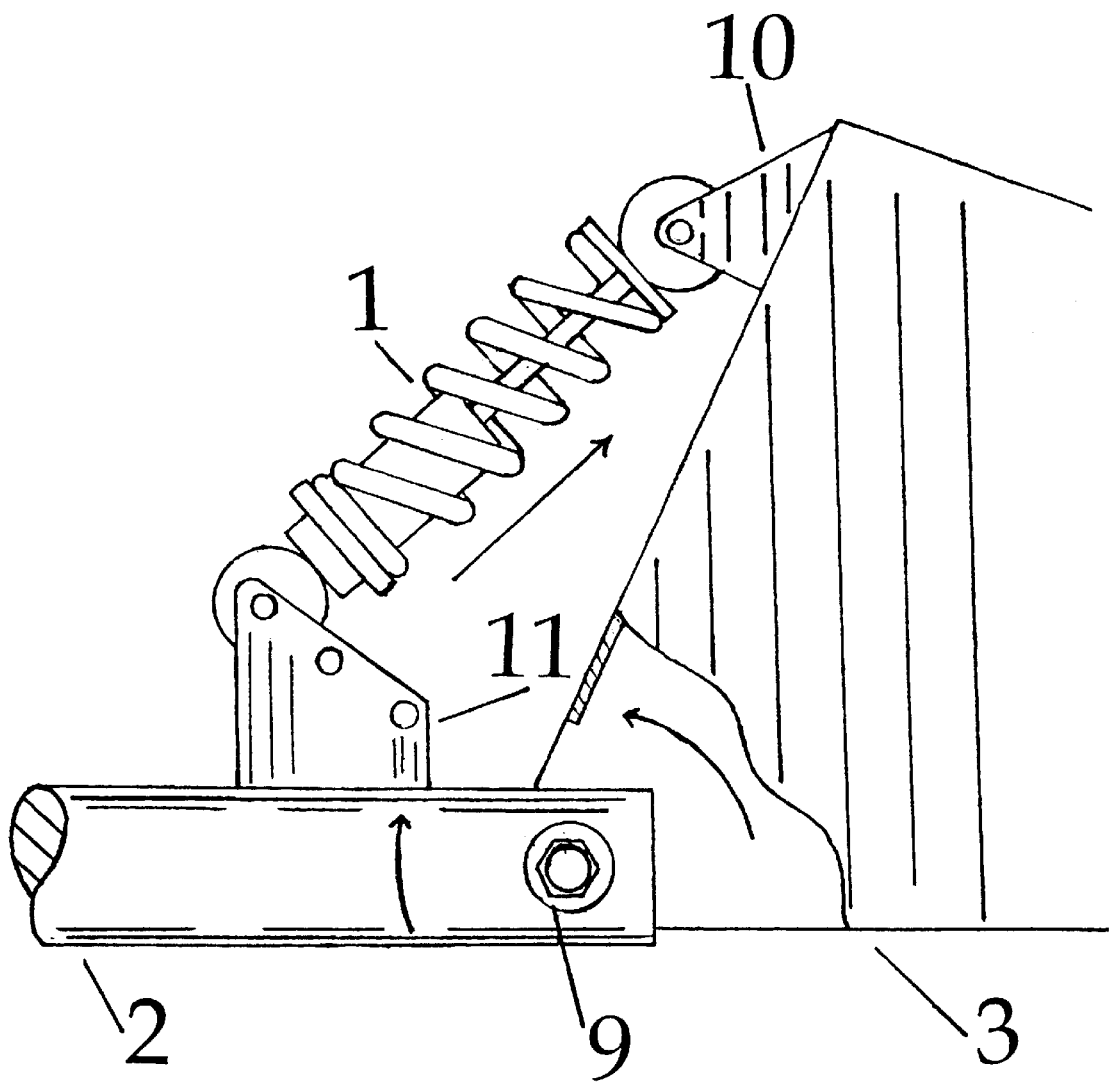
FIGS. 2A–2C show different mounting positions of the shock absorber.
Figure 2:
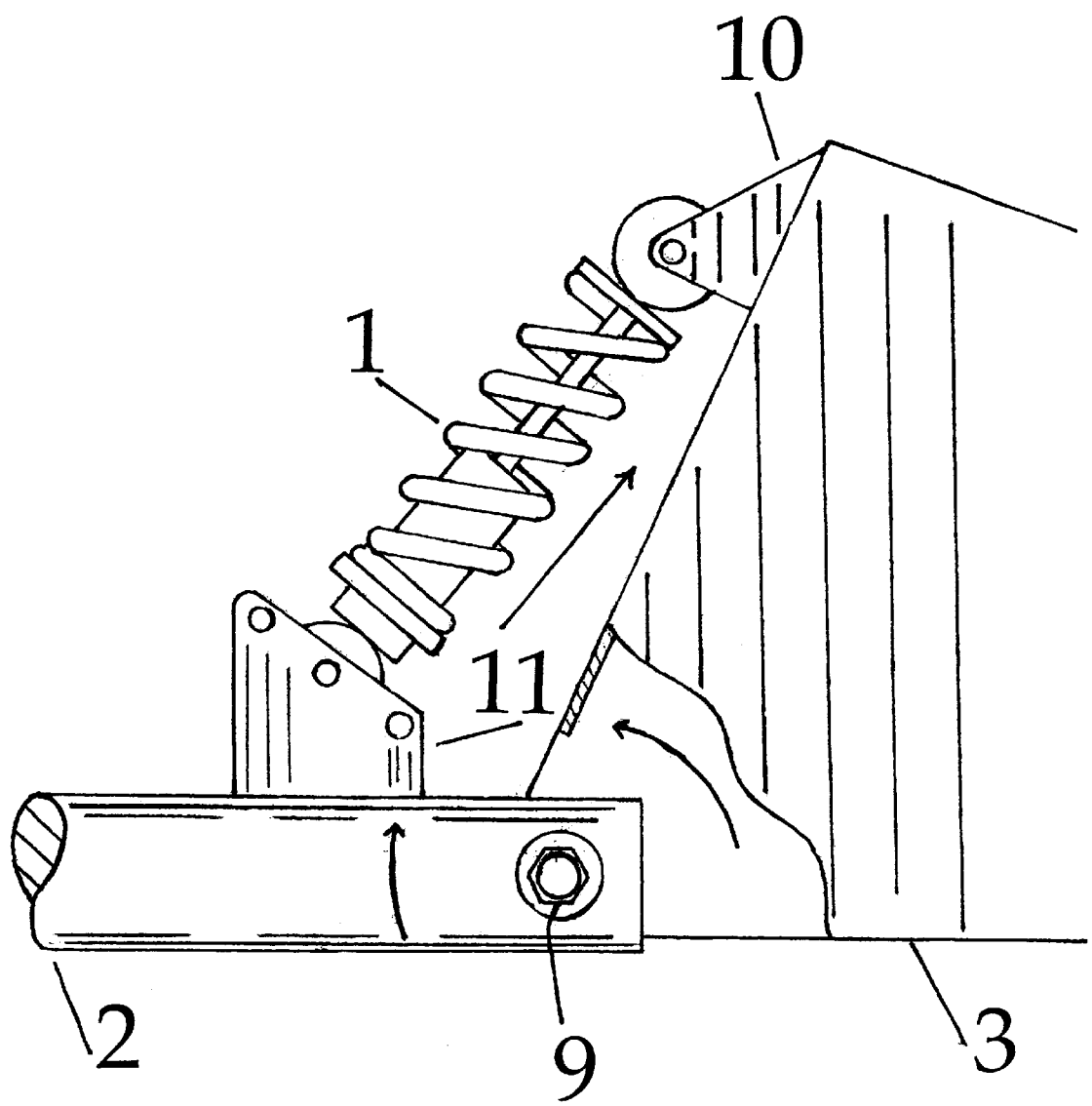
Figure 2:
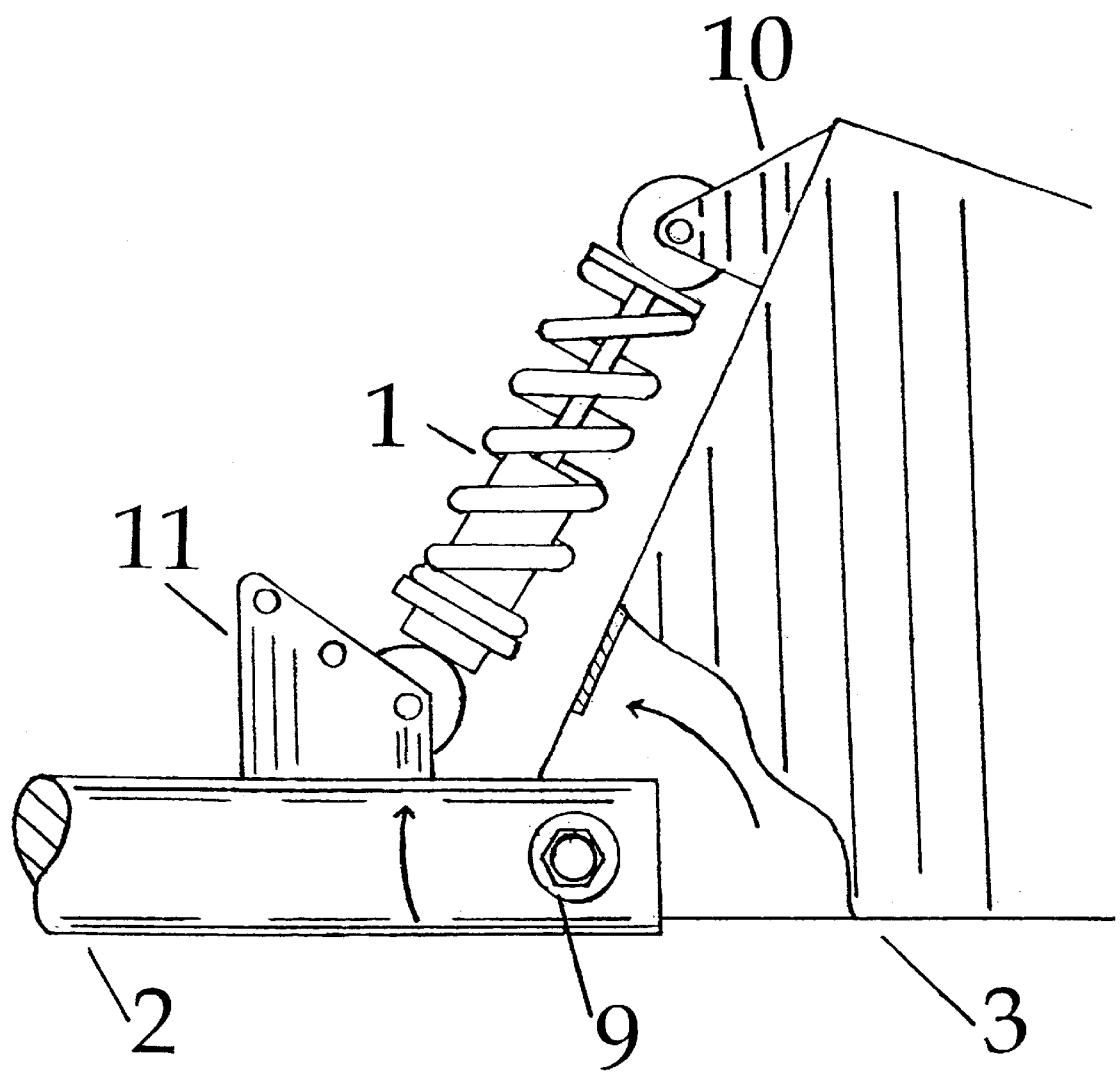
Figure 4:
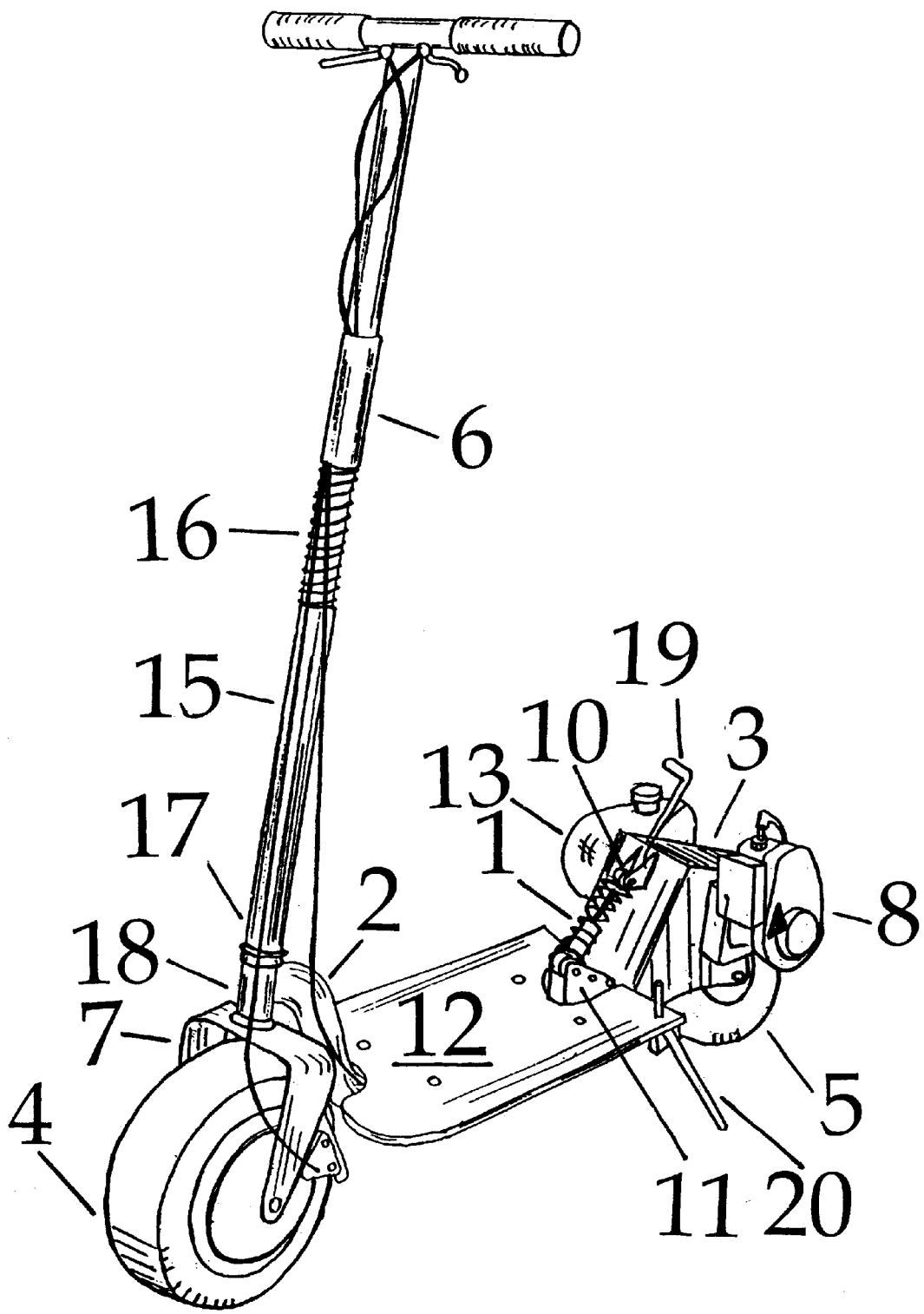
FIG. 4 is a perspective view of the scooter.
Figure 5:
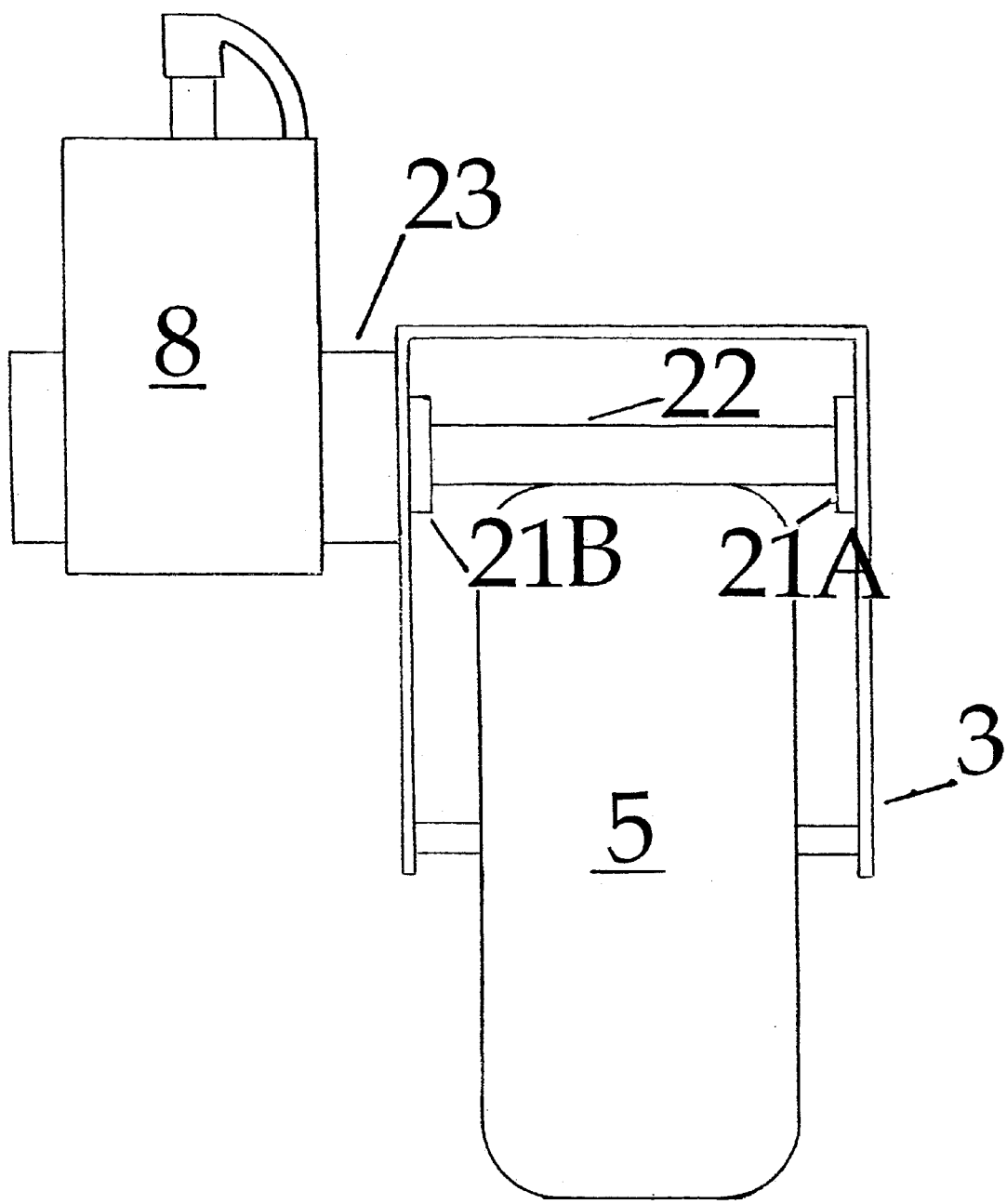
FIG. 5 is a rear view of the engine and drive system.

Referring particularly to the drawings by characters of reference, FIG. 1A discloses a motorized suspension scooter having a rider's platform 12, the top surface of which provides a platform for the feet of the user in which the board is supported by the front frame 2 and connected by one or more brackets 14a and 14b. FIG. 1 Front frame 2 can be of any material which lends structure and resistant to load inputs, such materials might include, tubing, plate, or a combination of such. FIG. 4 steering handle 6 is down over and parallel to rider's platform 12. The steering handle 6 is of a type having a spring biased reciprocating sleeve 15 fitting over a hinge 17 when spring biased reciprocating sleeve 15 over hinge 17 steering handle 6 is maintained vertical. FIG. 1B and FIG. 4 when spring biased reciprocating sleeve 15 is moved away from hinge 17; steering handle 6 can be bent to the horizontal disposition. The steering handle can be secured at hook latch 19 in the horizontal position. At the forward end of the front frame 2 fastens to head tube 18. As is traditional in such head tubes, this head tube 18 is substantially vertical having only a slight rake to and towards the rear of the scooter. Such a rake is in a common plane defined by steering column 24 axis and longitudinally axis. Steering column 24 axis is parallel to the steering handle. Longitudinal axis is taken longitudinally of the scooter chassis and is normal to the turning axis of the steered front wheel 4 when the front wheel steers in the forward direction. Front wheel 4 uses a disk braking system, however any braking system could be employed for retarding the rotation of the front wheel, or rear drive wheels such a caliber, drum, friction or V-brakes. Front frame 2 extends through the rider's platform 12 at the rider's platform notch. Therefore as seen in FIG. 1 main front frame 2 extends along the bottom of the riding platform 12 to facilitate fastening of riders platform 12, forward platform bracket 14a and rear platform bracket 14b securely mount riders platform 12 to front frame 2. From the vicinity of the rear platform bracket 14b, the main front frame 2 terminates in a horizontal pivot. A rear drive wheel 5 is supported to the front frame 2 adjacent to the rearward end thereof, by means of a rear frame 3, the lower end of which is open. The sides of the frame extend down to form a yoke to rotatably receive the rear drive wheel 5 secured to the rear frame 3 adjacent to the rearward end of the frame thereof is a motor or engine 8, preferably a gasoline engine which can either be a two or four cycle engine. A fuel tank 13 is located opposite the engine 8 on rear frame 3 FIG. 6 the engine 8 is operationally coupled via a drive spindle 22 supported by bearings 21a and 21b to the rear drive wheel 5. A clutch 23 may be employed between the engine and drive system. In FIG. 1, the front frame 2 is connected to the rear frame 3 by a horizontal pivot 9. FIG. 2A One end of a shock absorber 1 is attached to the front frame 2 by bracket 11. A notch is provided in the rider's platform 12 for clearance for this bracket 11. The other end of the shock absorber 1 is connected to the rear frame 3 by a bracket 10. FIG. 2A, 2B, 2C Bracket 10 or 11 can have multiple holes spaced apart from each other for receiving the shock absorber 1 ends. FIG. 1 and FIG. 4 show a handle arrangement of the motorized suspension scooter. In FIG. 1, a steering handle 6 in the form of an elongated tubular member is shown in upright position as used in operating the suspension motor scooter. At the upper end of the handle is a horizontal handlebar having handgrips such as made of rubber or plastic on each end thereof. Inside of the handgrips are the controls for the acceleration and braking of the suspension motor scooter. The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant. While the invention has been described with a certain degree of particularity it is manifest that many changes may be made in the details of construction and the arrangement of components without departing from the spirit and scope of this disclosure. It is understood that the inventions not limited to the embodiments set forth herein for purposes of exemplification. But is to be limited only the scope of the attached claim or claims, including the full range of equivalency to which each element thereof is entitled.

OPERATION OF INVENTION

Figure 3:
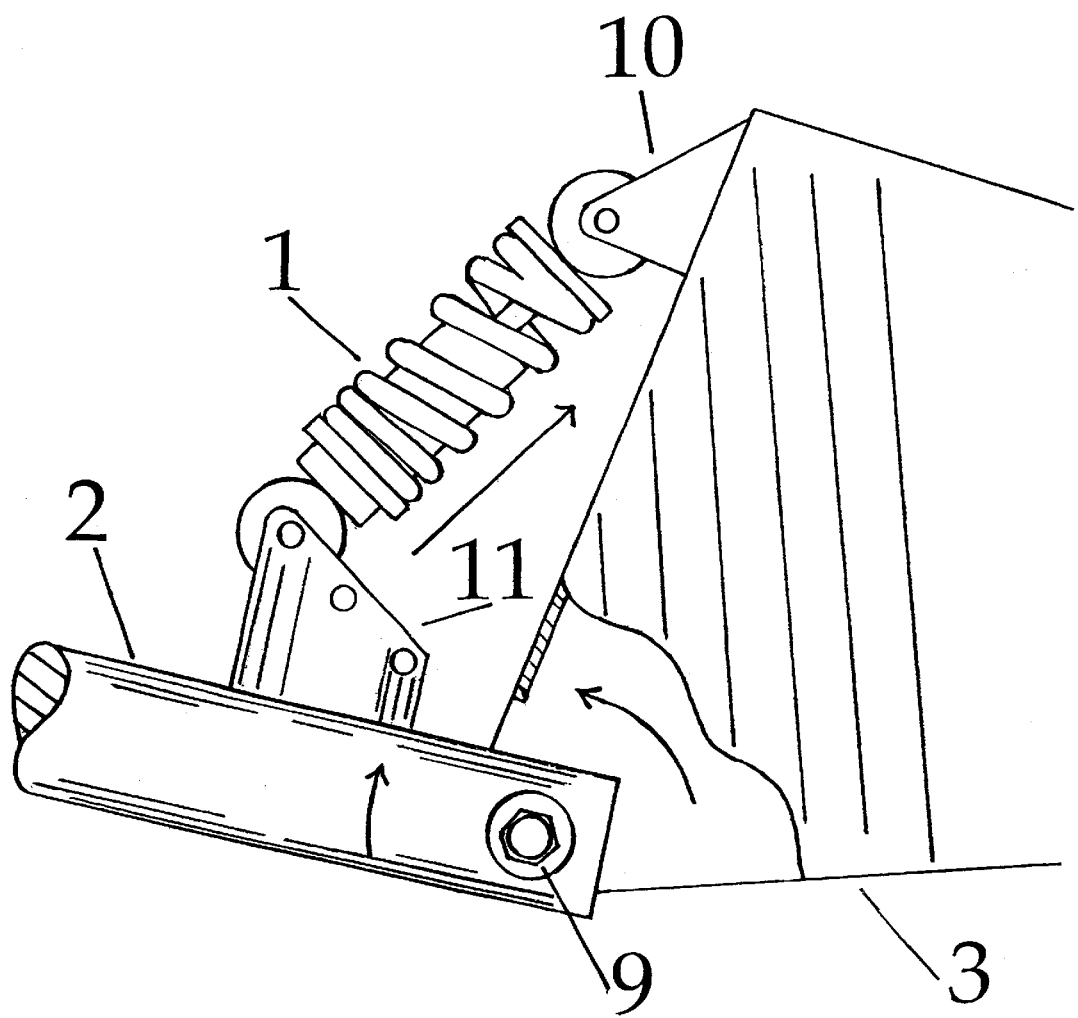
FIG. 3 shows the shock absorber when being compressed.

In FIG. 1 the front frame 2 is connected to the rear frame 3 by a horizontal pivot 9. One end of a shock absorber 1 is attached to the front frame 2 by shock mount front frame 11. The other end of the shock absorber 1 is connected to the rear frame 3 by a shock mount rear frame 10. FIGS. 2A, B, and D shock mount 10 or 11 can have multiple holes spaced apart from each other for receiving the shock absorber 1 ends. This allows the user to increase or decrease the shock absorbing ability of the shock absorber 1 by increasing or decreasing the leverage force input into the shock end. These spaced holes in the shock mount 10 or 11 are placed so that the shock absorber 1 can be moved from hole to hole without affecting the original orientation of the frame halves to each other. The rider stands on the riding platform 12 when operating scooter FIG. 3 when scooter transverses an uneven surface, the weight of the rider presses down on the riding platform 12, riding platform 12 is connected to the front frame 2. Since the front wheel 4 holds one end of the scooter upright, the force of the rider's weight is directed toward the horizontal pivot 9 in the frame. The rear drive wheel 5 also resists downward movement and directs downward force to the horizontal pivot 9. Subsequently the front frame 2 and the rear frame 3 rotate in relation to each other allowing riding platform 12 to be displaced downward. The shock absorber 1 resists the downward displacement, in this way the suspension system for the rider is accomplished. It will be apparent to those skilled in the art that various changes and modifications may be made therein without departing from the spirit of the invention or from the scope of the amended claims.

What is claimed is:

1. A motor powered scooter comprising:
   a front steered wheel;
   a rear driven wheel;
   a forward frame including a main structural element having a head tube mounted to a forward end thereof;
   a fork rotatably mounted in said head tube and supporting the front steered wheel;
   a platform mounted to a top surface of the main structural tube for supporting a rider thereon;
   a rear frame half pivotally mounted to the main structural element and rotationally mounting the rear driven wheel;
   a shock absorber pivotally mounted at one end to the forward frame at a first point, and at another end to the rear frame half at a second point;
   said second point being located above said first point during operation;
   a motor mounted to the rear frame half and being operationally connected to the rear driven wheel.

2. The motor powered scooter of claim 1, wherein:
   the shock absorber mount is a bracket.

3. The motor powered scooter of claim 2, wherein:
   the bracket includes a plurality of mounting holes for mounting the shock absorber.

4. The motor powered scooter of claim 3, wherein:
   the plurality of holes in the mounting bracket are so oriented that positioning the shock absorber into any hole does not change the orientation between the frame halves.

5. The motor powered scooter of claim 1, further comprising:
   a bracket mounted at a rear end of the main structural element and extending through a notch in said platform.

6. The motor powered scooter of claim 1, wherein:
   the shock absorber includes a compressive coil.

7. A motor powered scooter comprising:
   a front steered wheel;
   a rear driven wheel;
   a main structural element having a head tube mounted to a forward end thereof;
   a fork rotatably mounted in said head tube and supporting the front steered wheel;
   a platform mounted to a top surface of the main structural element for supporting a rider thereon;
   a bracket mounted at a rear end of the main structural element and extending through a notch in said platform;
   a rear frame half pivotally mounted to the main structural element and rotationally mounting the rear driven wheel;
   a shock absorber pivotally mounted at one end to the bracket, and at another end to the rear frame half;
   a motor mounted to the rear frame half and being operationally connected to the rear driven wheel.

8. A motor powered scooter comprising:
   a front steered wheel;
   a rear driven wheel;
   a folding handle bar;
   a forward frame including a main structural element having a head tube mounted to a forward end thereof;
   a fork rotatably mounted in said head tube and supporting the front steered wheel;
   a platform mounted to a the main structural element for supporting a rider thereon;
   a rear frame half pivotally mounted to the main structural element and rotationally mounting the rear driven wheel;
   a shock absorber pivotally mounted at one end to the forward frame, and at another end to the rear frame half;
   a motor mounted to the rear frame half and being operationally connected to the rear driven wheel.

\* \* \* \* \*

(12) EX PARTE REEXAMINATION CERTIFICATE (7355th)
United States Patent
Martin

(10) Number: US 6,338,393 C1
(45) Certificate Issued: Feb. 9, 2010

(54) PIVOTING FRAME SUSPENSION SCOOTER

(75) Inventor: Christopher V. Martin, Scottsdale, AZ (US)

(73) Assignee: Martin Manufacturing, Inc., Mesa, AZ (US)

Reexamination Request:
No. 90/006,455, Nov. 19, 2002

Reexamination Certificate for:
Patent No.: 6,338,393
Issued: Jan. 15, 2002
Appl. No.: 09/607,555
Filed: Jun. 29, 2000

(51) Int. Cl.
*B62D 61/02* (2006.01)
*B62K 11/10* (2006.01)

(52) U.S. Cl. .................................. 180/227; 180/228
(58) Field of Classification Search ................. None
See application file for complete search history.

(56) References Cited

U.S. PATENT DOCUMENTS

| | | |
|---|---|---|
| 3,329,228 A | 7/1967 | Harris |
| 3,354,976 A | 11/1967 | Camps |
| 4,019,594 A | 4/1977 | Koyama |
| 4,372,417 A | 2/1983 | Yamamoto et al. |
| 4,436,174 A | 3/1984 | Morisono |
| 4,799,567 A | 1/1989 | Gaddi |
| 4,821,832 A | 4/1989 | Patmont |
| 4,830,133 A | 5/1989 | Gaddi |
| D326,290 S | 5/1992 | Badsey |
| 5,265,695 A | 11/1993 | Piazzi |
| 5,388,659 A | 2/1995 | Pepe |
| 5,695,021 A | 12/1997 | Schaffner |
| D414,220 S | 9/1999 | Catto |
| 6,012,539 A | 1/2000 | Patmont |
| 6,338,393 B1 | 1/2002 | Martin |
| 6,431,302 B2 * | 8/2002 | Patmont et al. ............. 180/228 |

* cited by examiner

*Primary Examiner*—Beverly M. Flanagan

(57) ABSTRACT

An improved motorized scooter utilizing suspension provided with a large tubular chassis having two central brackets, supporting a rider's platform. The front of the tubular chassis bends upward through a notch in the platform upward above the front wheel to support a steering head tube. The steering head tube supports a fork which holds the front wheel. The rear wheel is contained in a supporting bracket which also holds the engine relative to the rear wheel allowing it to be operatively connected. The central tubular member is pivoted somewhere along its length so that the frame halves can rotate in respect to each other along the pivot point. The long lever arm provided by utilizing the frame as a suspension element allows for greater terrain following characteristics due to the increased leverage. Rotation between frame halves is resisted by a shock absorber with either end connected to the respective frame halves. When driving over uneven terrain, the weight of the rider forces down upon the rider's platform which is conected to one or the other frame halves, this suspension system allows the rider to transverse uneven terrain with greater comfort, control and safety.

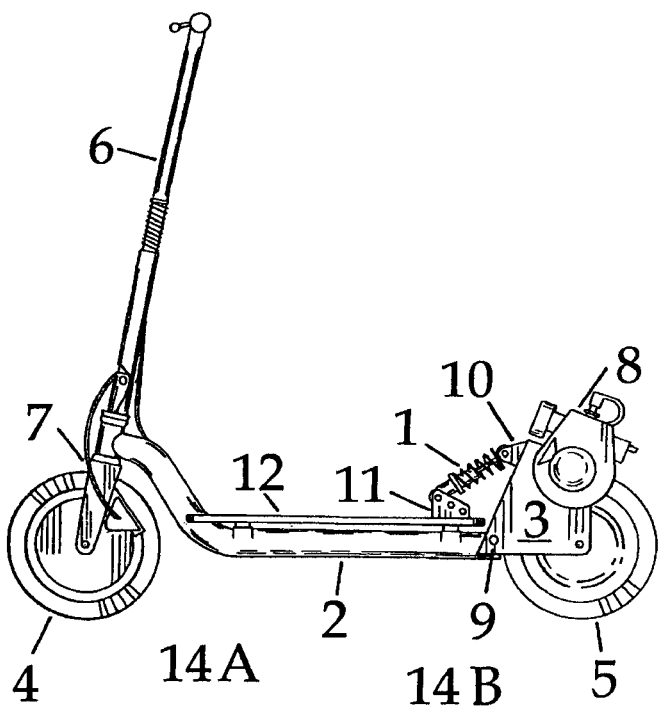

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7 is confirmed.

Claim 8 is determined to be patentable as amended.

8. A motor powered scooter comprising:
a front steered wheel;
a rear driven wheel;
a folding handle bar;
a forward frame including a main structural element having a head tube mounted to a forward end thereof;
a fork rotatably mounted in said head tube and supporting the front steered wheel;
a platform mounted to [a] the main structural element for supporting a rider thereon; *where in the vertical height of at least a portion of the top surface of the platform is lower than the vertical height of the top of the front wheel when the scooter is in an upright position and disposed on a level surface;*
a rear frame half pivotally mounted to the main structural element and rotationally mounting the rear driven wheel;
a shock absorber pivotally mounted at one end to the forward frame, and at another end to the rear frame half;
a motor mounted to the rear frame half and being operationally connected to the rear driven wheel.

\* \* \* \* \*